United States Patent
Aellig et al.

[11] 3,805,455
[45] Apr. 23, 1974

[54] APPARATUS FOR GRINDING PARALLEL EDGES OF GLASS SHEETS

[75] Inventors: Milton J. Aellig; Earle M. Powers, both of Toledo, Ohio; William E. Clark, Ellwood City, Pa.

[73] Assignee: Glassline Corporation, Toledo, Ohio

[22] Filed: Dec. 4, 1972

[21] Appl. No.: 311,674

[52] U.S. Cl.............................................. 51/80 A
[51] Int. Cl............................................ B24b 9/08
[58] Field of Search...... 51/76 R, 80 R, 80 A, 87 R, 51/138, 140; 144/32

[56] References Cited
UNITED STATES PATENTS

| | | | |
|---|---|---|---|
| 791,897 | 6/1905 | Gibian et al. | 51/80 A |
| 1,401,961 | 1/1922 | Coryell | 51/80 R |
| 1,505,867 | 8/1924 | Cote | 51/80 R |
| 2,170,687 | 8/1939 | Johnson | 51/80 A |
| 2,560,740 | 7/1951 | Pillow | 51/87 R |
| 2,671,992 | 3/1954 | Reaser et al. | 51/80 A |
| 3,041,788 | 7/1962 | Carlow | 51/87 R |

Primary Examiner—Othell M. Simpson
Attorney, Agent, or Firm—Henry K. Leonard

[57] ABSTRACT

An apparatus for finishing the parallel edges of glass sheets of various widths and lengths and a range of thicknesses. The apparatus has two sets of grinding heads, each set extending along one of the edges to be finished. One set is mounted on a transversely movable carriage so that glass sheets of different widths can be edged. Sets of hold-down and guide rollers extend along both the fixed reference side of the apparatus and along the carriage to hold the glass sheets in an established horizontal plane. The grinding heads are pivotable on transverse lines lying in the median plane of the glass sheet so as to minimize the degree of dressing necessary on grooved grinding wheels and are pivotable on longitudinal lines to be swung up for wheel dressing. Each grinding head spindle mount two or more individual wheels having different edge profiles and the heads are movable vertically relative to the glass plane to select the wheels to be employed. During grinding, each wheel lies within an individual coolant shield which has a slot at its inner side through which the respective edge of the glass extends into contact with the wheel.

10 Claims, 13 Drawing Figures

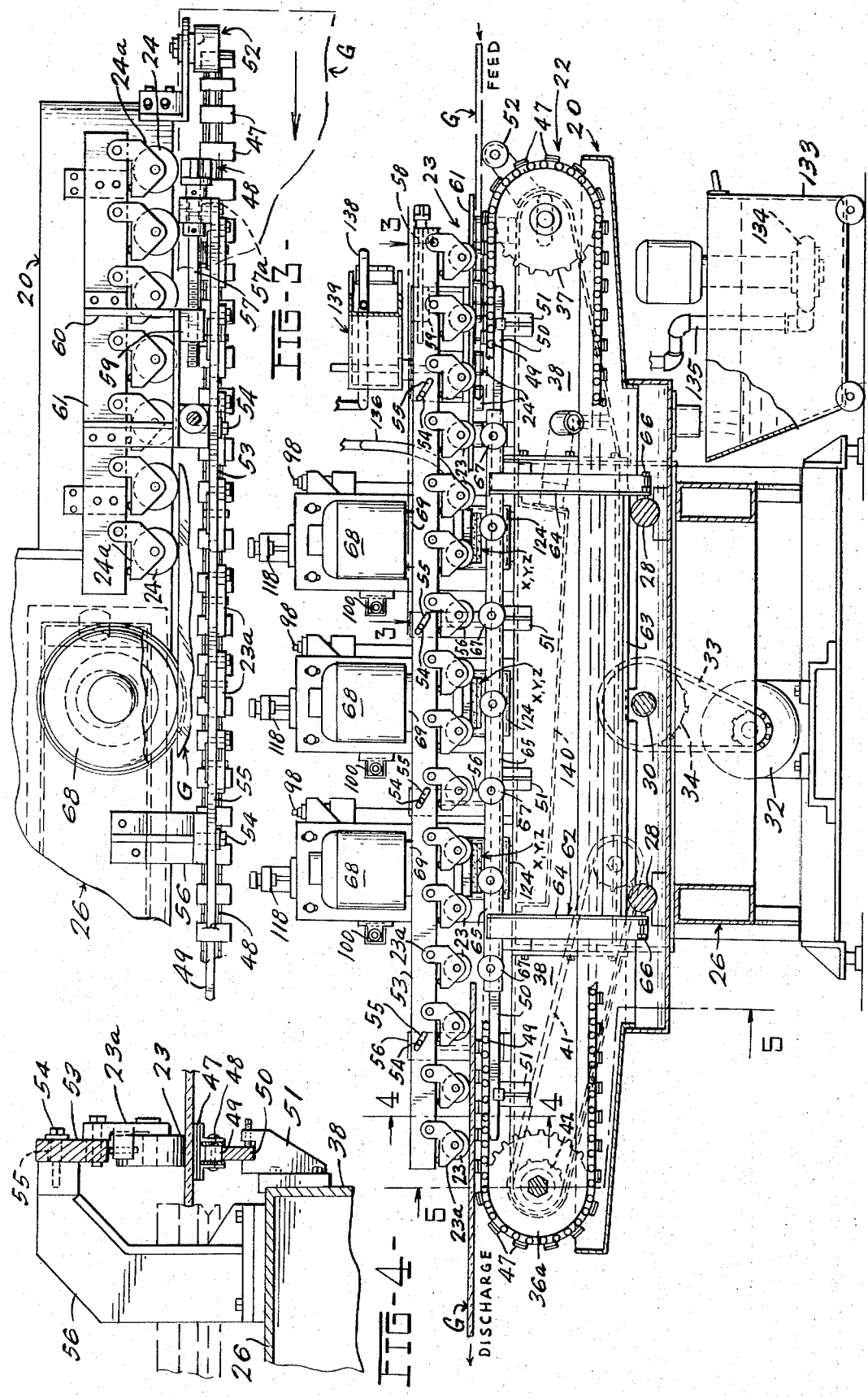

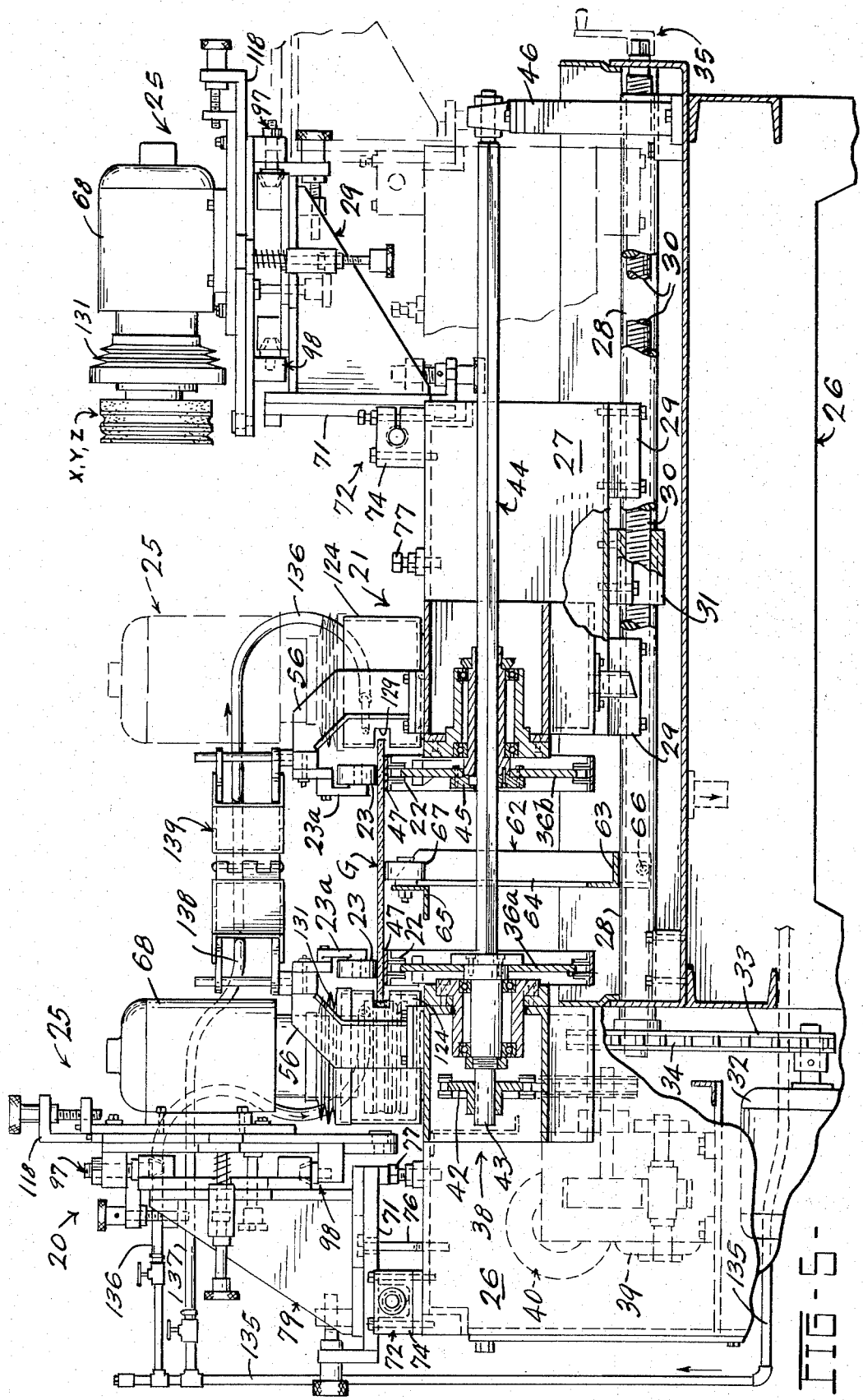
FIG-5-

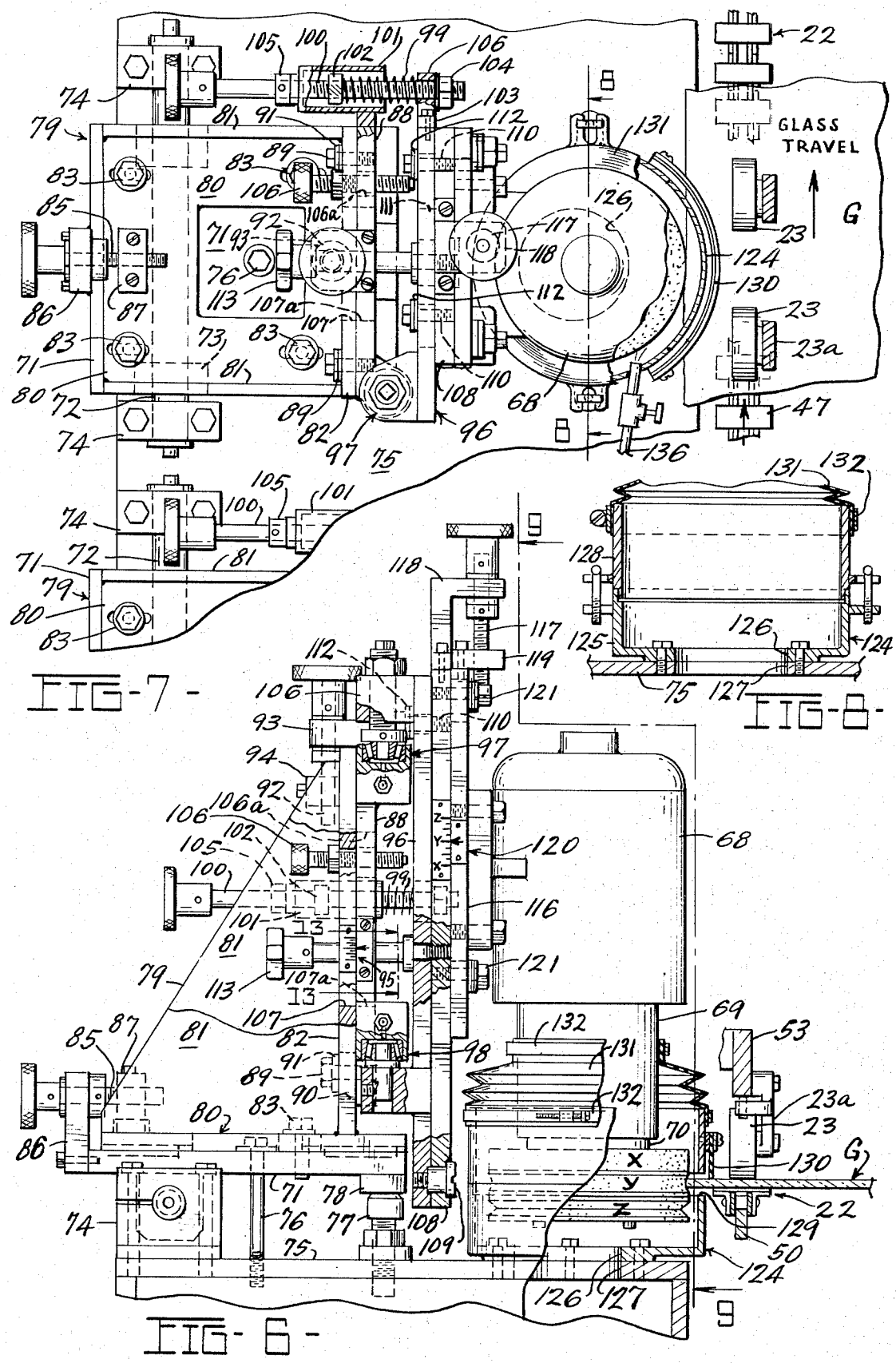

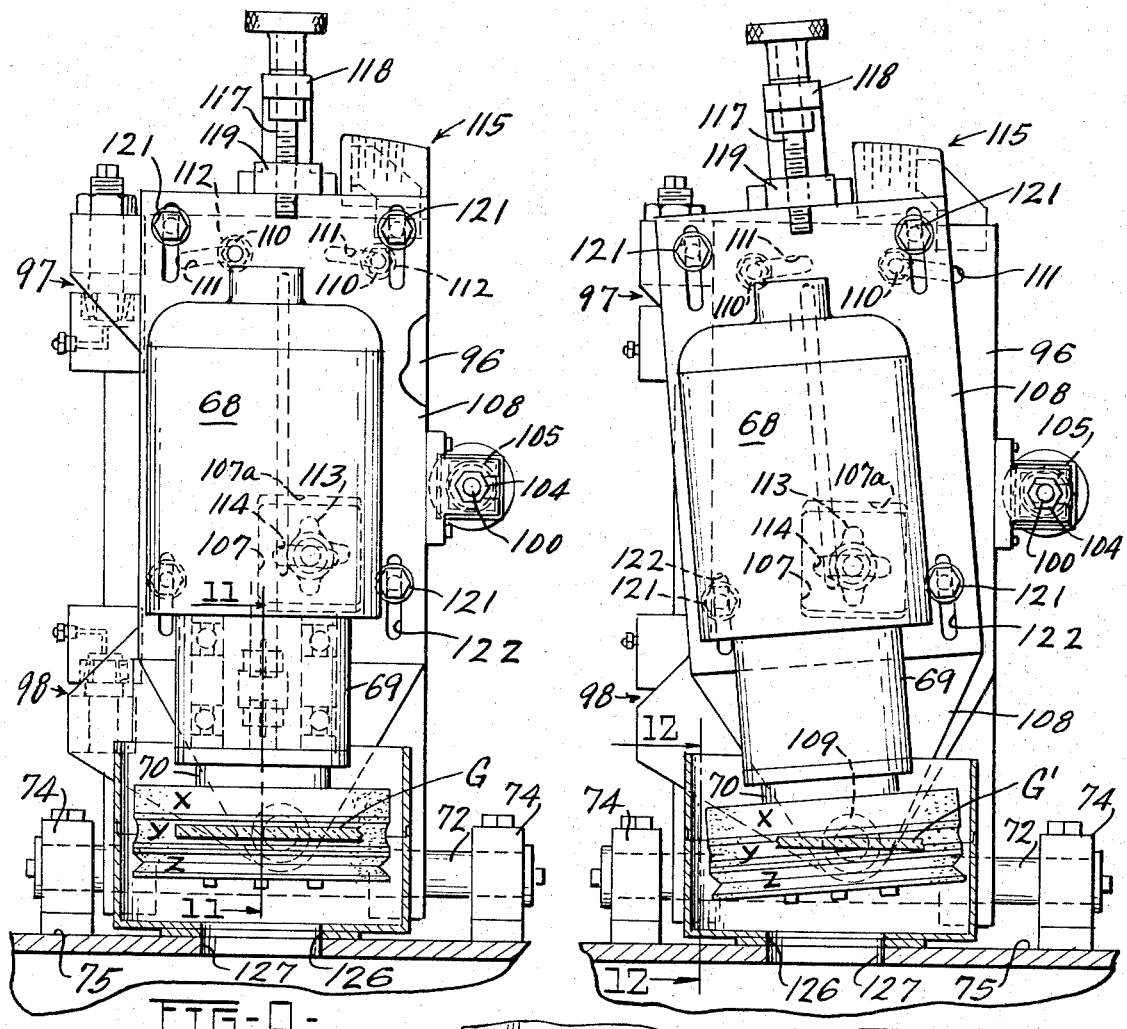
FIG-9-
FIG-10-
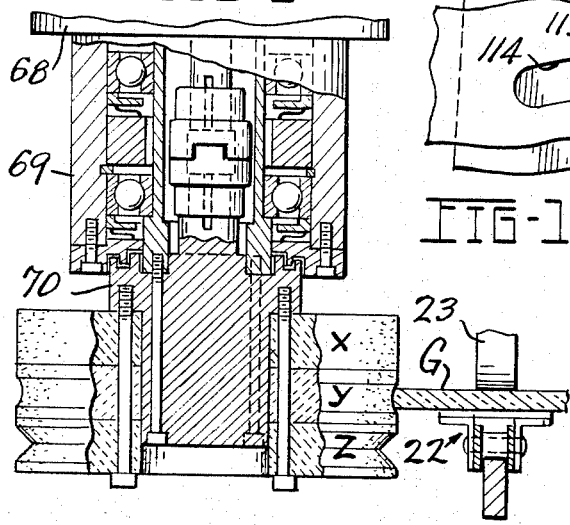
FIG-11-
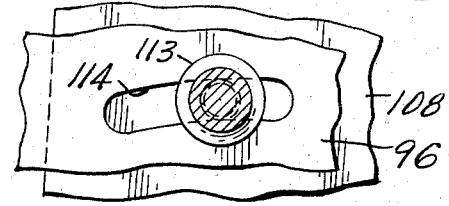
FIG-13-
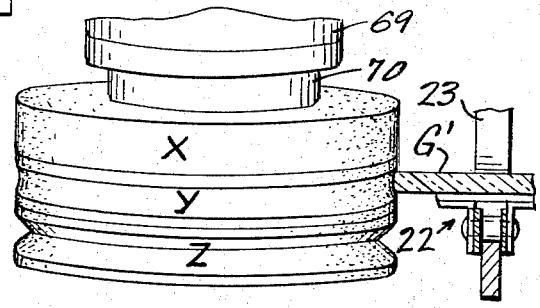
FIG-12-

APPARATUS FOR GRINDING PARALLEL EDGES OF GLASS SHEETS

BACKGROUND OF THE INVENTION

Machines for simultaneously finishing the parallel edges of sheets of glass by the utilization of sets of grinding heads spaced along both sides of a path have been suggested in the past. Most of these machines have been designed for use in grinding glass sheets of a fixed width and a single thickness. Some of these machines have provided for moving one of the sets of grinding wheels laterally relatively to the other to accommodate sheets of differing widths but in such machines, it has been difficult if not impossible to dress the faces of the grinding wheels without removing them from the grinding arbors. In addition, in machines of this type, it has been extremely difficult to control the flow and collection of the coolant so as to insure a good supply to the edges of the grinding wheels and to the surface of the glass being ground both to flush away the ground glass particles removed from the edges of the glass and to insure a constant supply of coolant to the grinding wheels.

When high volume production of glass sheets having parallel edges is desired, most machines suitable for their finishing have required an individual set up of some complexity for each different width or thickness. In most such machines it has been necessary to change grinding wheels even when the thickness of the glass pane to be finished changed only slightly.

It is therefore the principal object of the instant invention to provide a high production machine for finishing the parallel edges of glass sheets which can readily and quickly be changed to accommodate sheets of different widths, and to utilize all of the grooved surface of the diamond wheels thus minimizing the degree of dressing necessary for wheels which grind a "pencil" edge, without the necessity of changing wheels and to enable the ready selection of wheels having different profiles for selecting the desired edge finish.

BRIEF DESCRIPTION OF THE DRAWINGS

FIG. 2 is a vertical sectional view taken along the line 2—2 of FIG. 1;

FIG. 3 is a fragmentary horizontal view, partly in plan taken from the position indicated by the line 3—3 of FIG. 2 and shown on an enlarged scale;

FIG. 4 is a fragmentary, vertical sectional view taken along the line 4—4 of FIG. 2 and shown on greatly enlarged scale;

FIG. 5 is a fragmentary, transverse, vertical sectional view taken along the line 5—5 of FIG. 2 and shown on an enlarged scale;

FIG. 6 is a greatly enlarged fragmentary view in side elevation of one of the grinding heads with which a machine embodying the invention is equipped;

FIG. 7 is a fragmentary plan view of the grinding head illustrated in FIG. 6;

FIG. 8 is a fragmentary, vertical sectional view taken along the line 8—8 of FIG. 7;

FIG. 9 is a view primarily in elevation with parts being shown in section, taken from the position indicated by the line 9—9 of FIG. 6;

FIG. 10 is a view similar to FIG. 9 but showing the apparatus in an adjusted position;

FIG. 11 is a fragmentary, vertical sectional view taken along the line 11—11 of FIG. 9;

FIG. 12 is a fragmentary view taken along the line 12—12 of FIG. 10; and

FIG. 13 is a detailed, fragmentary view taken from the position indicated by the arrows 13—13 of FIG. 6.

DESCRIPTION OF PREFERRED EMBODIMENT

General Description

Figure 1:
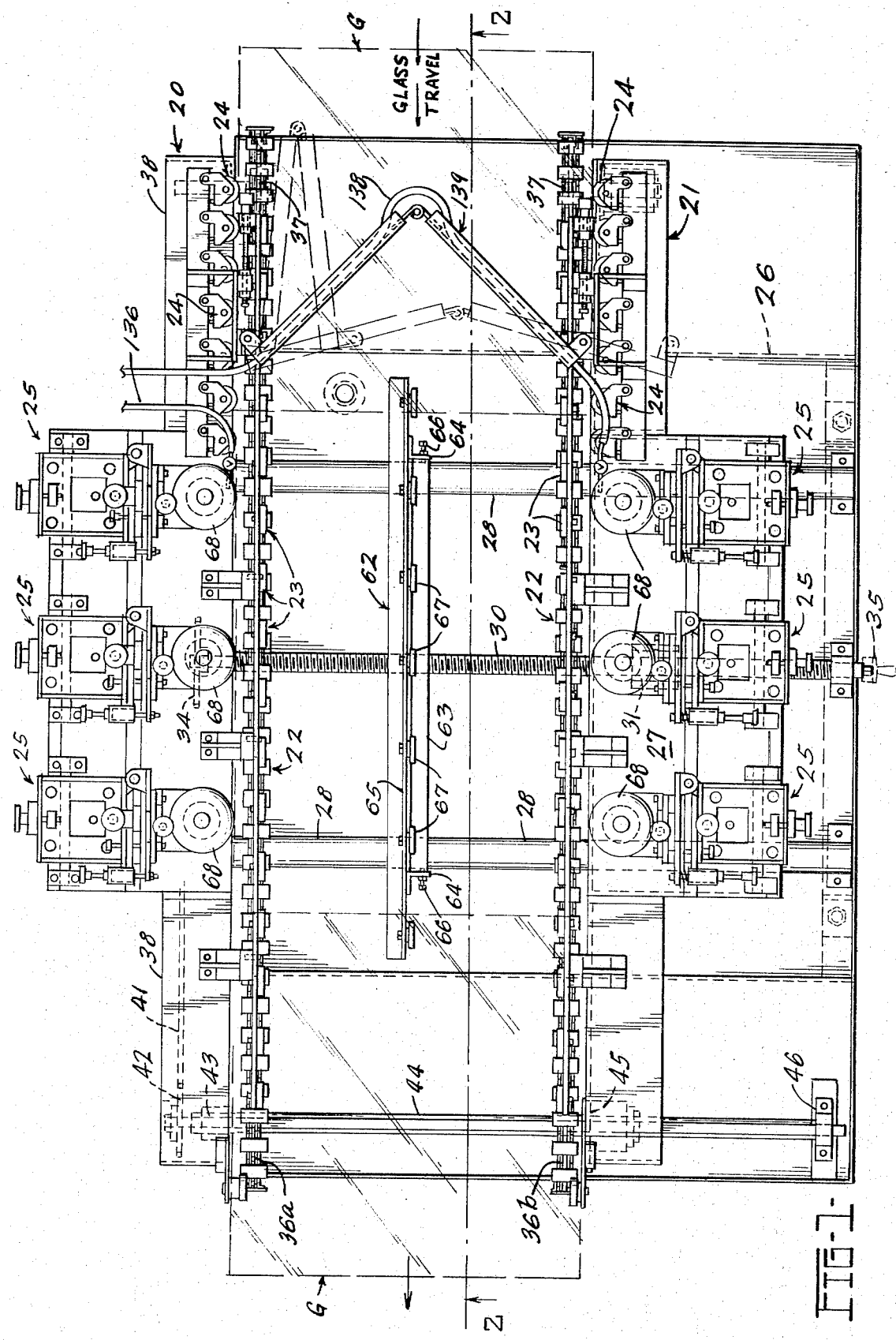
FIG. 1 is a plan view of an apparatus embodying the invention.

An apparatus embodying the invention has a stationary side, generally indicated by the reference number 20 and a parallel, movable side 21.

The two sides 20 and 21 are substantially identical in construction and operation except for their mounting on the machine and the manner in which electrical power and liquid coolant are delivered to them and except for the mechanism by which the movable side 21 is adjusted toward or away from the stationary side 20 in order to accommodate glass sheets of different widths. In the following description, the parts and subassemblies of only one of the sides 20 or 21 will be described in detail which will also constitute a description of the other side except for those relatively few items which differ from each other.

Each of the two sides 20 and 21 comprises a longitudinally extending conveyor chain 22, a series of hold down rollers 23, a series of edge guide rollers 24 and, in this embodiment, three grinding heads 25.

Sheets of glass G to be edged are fed longitudinally along the apparatus between the grinding heads 25 by the parallel conveyor chains 22, lying in a horizontal reference plane established by the upper surfaces of the conveyor chains 22 in order to grind their edges to a finished width selected by the lateral spacing between the edges of the grinding wheels mounted in the heads 25 and with an edge of a shape determined by the selection of the profile of the particular grinding wheels selected to be employed.

The conveyor chain 22, the series of rollers 23 and 24 and the grinding heads 25 comprising the stationary side 20 are all supported in fixed position upon a massive base frame 26 (FIGS. 2 and 5) which extend across the apparatus. The conveyor chain 22, the series of rollers 23 and 24 and the grinding heads 25 comprising the movable side 21 are all mounted on a laterally movable carriage 27.

The carriage 27 is supported on and guided by a pair of spaced, parallel, horizontal, cross bars 28 which structurally are elements of the base frame 26. Shoes 29 on the bottom of the carriage 27 slide on the cross bars 28. A screw 30 is rotatably mounted in and extends across the frame 26 being engaged by a nut 31 also mounted on the bottom of the carriage 27. The screw 30 is rotated by a reversible motor 32 which powers a drive chain 33 that is engaged with a sprocket 34 on the end of the screw 30. Rotation of the screw 30 moves the carriage 27 toward or away from the stationary side 20 as required to set up the apparatus for edging glass sheets of different widths. A hand crank 35 may be engaged with the far end of the screw 30 if desired.

The conveyor chains 22 are engaged with driving sprockets 36a or 36b and idler sprockets 37 suitably journaled, respectively, in a longitudinally extending side frame (FIG. 2) or the carriage 27. The driving sprocket 36a is rotated by a conveyor motor 39 acting through a transmission 40 which has an output chain 41 that is engaged with a sprocket 42. The sprocket 42 is mounted on a shaft 43 upon which the conveyor sprocket 36a is secured and has a hex bar extension 44. The hex bar 44 extends through a matching collar 45 on the sprocket 36b and is journaled at its far end upon a pedestal 46 erected on the frame 26. The two drive sprockets 36a and 36b are thus driven at the same speed regardless of the lateral position of the carriage 27.

Glass Sheet Conveyor and Guides

The two conveyor chains 22 are identical in construction, each of them consisting of a series of pads 47 (FIGS. 3 and 4) carried on and connected together by intervening chain links 48. Link rollers 49 ride on horizontal tracks 50 which are, in turn, supported by brackets 51 which are mounted on the side frame 38 or the carriage 27. The pads 47 on the tracks 50 establish the horizontal plane for a sheet of glass being edge ground and the reference plane with respect to which the grinding heads 25 are adjustable to position their grinding wheels as will later be described.

Outboard support rollers 52 are mounted on each side of the apparatus at a level such that an operator may rest the leading edge of a sheet of glass on the rollers 52 as it is fed onto the conveyor chains 22.

Each of the series of hold down rollers 23 extends along above and in line with the respective conveyor chain 22. Each hold down roller 23 is rotatably mounted at the end of a holder 23a which is in turn pivotally carried by a longitudinally extending adjustment bar 53. The bar 53 is carried by several shoulder screws 54 which extend through 45° slots 55 cut in the bar 53 and set into overhead brackets 56 erected on the side frame 38 or carriage 27. An adjustment screw 57 extends through a slot 57a in an ear 58 which is attached to one end of the bar 53 and through a nut 59 mounted on the end of an arm 60 extending upwardly from the frame 38 or carriage 27. Rotation of the screw 57 moves the bar 53 longitudinally up and down the slots 55 to raise or lower the hold down rollers 23 relative to the conveyor pads 47 to insure a firm frictional contact with the surfaces of glass sheets of different thicknesses.

Each of the edge guide rollers 24 is similarly mounted by a holder 24a and the holders 24a are pivotally carried by a fixed position bar 61 which is mounted on the frame 38 or the carriage 27. The edge guide rollers 24 are so positioned horizontally as to guide the parallel edges of a glass sheet as it is fed forwardly into contact with the first opposed pair of the grinding wheels.

A center support for the glass sheets is provided by an open frame 62 (FIGS. 2 and 5) consisting of a bottom angle 63, two uprights 64 and a top bar 65. The bottom angle 63 rides on the crossbars 28 and the frame 62 is locked in position by oppositely acting locking screws 66 threaded through the lower ends of the uprights 65 and bearing on the outer sides of the crossbars 28. Rollers 67 are mounted along the top bar 65, their peripheries contacting the reference plane established by the conveyor pads 47.

Grinding Heads

In the embodiment of the invention shown in the drawings the apparatus has six grinding heads 25 consisting of three pairs, each laterally opposed pair being provided with grinding wheels of the same type, for example, rough cut on the first pair, medium or fine cut on the second pair and fine or polish cut on the third pair.

Each grinding head has its own motor 68, bearing 69 and spindle 70 (see FIG. 11). Each spindle 70 is capable of mounting more than one grinding wheel, in this embodiment three are shown as indicated by the letters $x$, $y$ and $z$ in FIGS. 6, 11 and 12. It will be seen that the peripheries of the wheels $x$ are cylindrical, of the wheels $y$ are arcuately grooved, and of the wheels $z$ are bevel grooved. Thus, by an adjustment to be later described, all or each of the heads 25 may be raised or lowered to apply the wheels $x$, $y$ or $z$ to the glass sheet depending upon the shape of the edge which is desired.

Each grinding head 25 has a base plate 71 (FIG. 6) which is mounted by a trunnion 72 which extends through ears 73 on the underside of the plate 71 and through saddle blocks 74 erected on a table 75 of the stationary side frame 38 or the carriage 27. The entire head 75 may be swung from operative position shown at the left in FIG. 5 (and in FIGS. 6, 7 and 9–12) to inoperative position shown at the right in FIG. 5 for access to the grinding wheels $x$, $y$, and $z$ in order to change or size the wheels. The head 25 is held in operative position by a locking bolt 76 which extends through the plate 71 and into a tapped hole in the table 75. An adjustable stop 77 is also mounted on the table 75 and engaged by a pad 78 on the base plate 71 to establish the plate 71 in a horizontal plane so that the spindle 70 is vertical.

A massive right angle grinding head frame 79 consists of a bottom plate 80, two angular braces 81, and a front vertical plate 82. The bottom plate 80 slides on the base plate 71 being guided for movement in and out by machine screws 83 which extend through guide slots 84 into the base plate 71. An adjustment screw 85 extends through an ear 86 on the base plate 71 and engages a tapped post 87 on the bottom plate. Rotation of the screw 85 moves the entire grinding head toward or away from the opposed grinding head to establish the lateral spacing between the glass engaging peripheries of the grinding wheels.

A vertical support plate 88 is adjustably mounted on the inner side of the front plate 82 by four machine screws 89 which extend through vertical slots 90 in the plate 82 and are set into tapped holes in the plate 88. Belleville washers 91 are compressed between the heads of the screws 89 and the back surface of the plate 82. An adjustment screw 92 extends through a rearwardly overhanging ear 93 and a threaded boss 94 on the rear of the plate 82. As will later be further explained, rotation of the screw 92 is utilized to move the support plate 88 small increments of vertical distance. The setting is shown by indicia 95 on the adjacent edges of the stationary front plate 82 and the vertically movable support plate 88.

A vertical hinge plate 96 is pivotally mounted to swing on a vertical hinge axis by co-operating hinge members 97 and 98 located at the adjacent vertical edges of the support plate 88 and hinge plate 96. The hinge plate 96 is urged inwardly by a coil spring 99 (FIG. 7) which is positioned around an adjustment screw 100. The screw 100 extends through a square socket 101 on the plate 88 and a square nut 102 is located inside of the socket 101. The screw 100 also extends through an ear 103 on the hinge plate 96 and has a stop nut 104 on its inner end. A collar 105 on the outer side of the socket 101 limits the inward movement of the screw 100. Rotation of the screw 100 moves the square nut in the socket 101 to vary the bias on the hinge plate and the pressure of the grinding wheels $x$, $y$ or $z$ against the edge of the glass plate being ground. The stop nut 104 is positioned on the screw 100 to establish the inward limit of movement of the hinge plate 96 and the grinding wheel. A backstop 106 is threaded through the front plate 82 and extends through a slot 106 in the support plate 88 to within a determined distance say one-sixteenth inch of the back surface of the hinge plate 96 to limit its outward movement.

A tilting plate 108 (see also FIGS. 9 and 10) is mounted by a shouldered stud 109 to tilt on a horizontal axis. The earlier described screw 92 is rotated to place the axis of the stud 109 in the median horizontal plane of the glass sheet as indicated when the indicia 95 are properly aligned. Two screws 110 extend through arcuate slots 111 cut in the hinge plate 96 on an arc swung around the center of the stud 109 and the screws 110 are threaded into the tilting plate 108 to compress Belleville washers 112 against the rear surface of the hinge plate 96 in order to resist free tilting movement of the tilting plate 108. The tilting plate 108 is held in any adjusted position by a shouldered clamping screw 113 (see also FIG. 13) which extends through cutouts 107 and 107a in the plates 82 and 88, through an arcuate slot 114 in the hinge plate 96 and into a tapped hole in the tilting plate 108. The angle of tilt (see FIG. 10) is shown by cooperating indicia and index generally indicated by the reference number 115, located on the tilting plate 108 and the hinge plate 96. A different angle is required for sheets of different thicknesses and wheels $y$ have corresponding profiles in order to spread the wear over the wheel surfaces and minimize wheel dressing.

The selection of the particular grinding wheel $x$, $y$ or $z$ is made by shifting a vertically movable motor mounting plate 116 relative to the tilting plate 108. An elevating screw 117 extends through an overhanging bracket on the top of the tilting plate 108 and is threaded in a lower ear 119 on the motor mounting plate 116. Indicia 120 on the adjacent edges of the plates 108 and 116 indicate which of the wheels is in grinding position. Movement of the motor mounting plate 116 is guided by studs 121 extending through vertical slots 122 in the plate 108 and clamping Belleville washers 123 against the inner surface of the plate 108.

The elevating screw 117 is utilized to select which of the grinding wheels $x$, $y$ or $z$ is to be employed for the particular edge treatment of the sheet of glass being edged in order to produce, respectively, a flat edge, a "pencil" edge or a double bevelled edge. When a single bevel, such as for a mirror is to be produced, the grinding heads 25 are swung up to their inoperative positions and suitable wheels are mounted on their spindles 70. The adjusting screw 92 is utilized to center the selected wheel $x$, $y$ or $z$ relative to the particular sheet of glass.

The tilting plate 108 is tipped from its upright position of FIGS. 9 and 11 to an angled position of FIGS. 10 and 12 when it is desired to utilize the wheels $y$ to produce a "pencil" edge on sheets of glass G'. Reference to FIG. 9 shows how a sheet of glass would cut its profile into the wheel $y$ thereafter requiring the removal of a considerable part of the wheel surface to restore the original wheel profile. FIGS. 10 and 12 illustrate how the entire surface of the groove in a wheel $y$ is utilized in order to distribute the wear and thus minimize the removal of wheel material during dressing.

Coolant Shields and Supply

Each of the grinding heads 25 has a coolant shield, generally indicated by the reference number 124 (see also FIG. 8) that is mounted on the table 75 in position to surround the grinding wheels when the head 25 is in operative position. Each shield 124 comprises an open bottom pan 125 bolted to the table 75 with its bottom opening 126 aligned with an opening 127 in the table 75 and a removable collar 128. The inner adjacent edges of the pan 125 and collar 128 are cut away to provide an arcuate horizontal slot 129 (FIG. 6) through which the edge of a glass sheet being ground extends into contact with the grinding wheel being employed. A flexible skirt 130 extends around the slot 129.

Each bearing housing 69 carries a bellows 131 (not shown in FIGS. 9–11, for clarity) which is removably attached to the upper edge of the shield collar 128 when the head is in operative position by a clamping ring 132.

Coolant for all the heads 25 is supplied from a tank 133 (FIG. 2) by a pump 134 through a main supply pipe 135 (see also FIG. 5) which leads up to the level of the grinding heads 25 on the stationary side 20. The pipe 135 is then divided with one group of individual tubes 136 leading to the coolant shields on that side of the apparatus. A similar group of individual tubes 136 for the heads 25 on the movable side 21 are fed by a branch pipe 137 which is connected to the tubes 136 by an overhead conduit 138. The conduit 138 is carried by a scissors bridge 139 extending across the glass being ground.

A coolant catch pan 140 (FIG. 2) lies beneath heads on each side to receive coolant flowing down through the openings 126 and 127 (FIG. 8) whence it drains to an underlying pan 141 (FIGS. 2 and 5) and, through a drain 142, flows back into the supply tank 133 for recirculation thus keeping a majority of coolant off of the glass.

What we claim is:

1. An apparatus for grinding the spaced parallel edges of glass sheets, comprising, in combination,
   a. a main longitudinally extending frame,
   b. a longitudinally extending carriage movably mounted on said frame for lateral movement and positionable thereon for handling sheets of different widths,
   c. a sheet conveyor comprising two parallel, longitudinally extending elements, one of said elements being mounted on said frame and the other of said elements being mounted on said carriage,
   d. means on said frame and said carriage for supporting said conveyor elements with their upper surfaces lying in the same horizontal plane for supporting and conveying a sheet through said apparatus,
   e. at least one pair of grinding heads mounted in lateral alignment on said frame and said carriage, each of said grinding heads comprising a normally vertical spindle and a grinding head mounted on said spindle, f. means for adjustably positioning each of said grinding heads and wheels vertically relative to the plane of said conveyor elements and laterally relative to said frame and said carriage, respectively, and g. means on said grinding heads for biasing said spindles and said wheels inwardly toward each other between determined maximum and minimum distances therebetween.

2. An apparatus according to claim 1 in which the grinding heads are mounted on horizontal, longitudinally extending axes and are movable from normal position upwardly and outwardly on said axes for access to the spindles and grinding wheels.

3. An apparatus according to claim 1 and an individual coolant shield for each of the grinding wheels, said shield comprising a ring secured to the respective one of said frame and said carriage and a shroud carried on the lower end of the respective one of said spindles, said ring having a horizontal, sheet receiving, chord-like slot at its inner side.

4. An apparatus according to claim 3 and a drain opening for each of the coolant shields, a coolant tank, catch pans extending beneath such drain openings and leading to said tank, and a coolant feeding system comprising a pump and conduits from said tank to each of said shields.

5. In an apparatus according to claim 1, the improvement comprising, means for tilting each of said grinding heads on an axis extending transversely of the path of movement of the glass sheet for tilting a grinding wheel relative to the plane of the conveyor and the glass sheet conveyed thereon and adjustable means for positioning said axis in the median horizontal plane of the glass sheet.

6. An apparatus according to claim 1 and longitudinally extending hold down means on said frame and on said carriage extending along above each of the conveyor elements, said hold down means comprising mounting and adjusting means for selectively spacing said hold down means above said conveyor elements for holding down glass sheets of different thicknesses.

7. An apparatus according to claim 1 in which there are more than one pair of grinding heads, the grinding heads of each pair located on the frame being transversely aligned with the grinding heads of each pair located on the carriage.

8. An apparatus according to claim 1 in which a plurality of grinding wheels having different profiles is mounted on each of the spindles and each of said spindles is adjustably movable vertically relative to the respective grinding head for positioning the appropriate one of said wheels for grinding engagement with the edge of the sheet being ground.

9. An apparatus for grinding pencil edges on the parallel edges of a sheet of glass comprising, in combination, a. a glass sheet conveyor comprising means for supporting a glass sheet with its bottom surface in a predetermined plane and for feeding said sheet along a fixed path through said apparatus, b. a grinding head mounted on said apparatus at one side of such path, c. an opposed grinding head mounted on said apparatus at the opposite side of said path, d. each of said grinding heads comprising a spindle extending perpendicularly to the plane of such glass sheet, means for rotating said spindle and a grinding wheel having a U-groove edge that is mounted on said spindle, e. means translating at least one of said spindles for establishing a selected lateral spacing between the edges of said grinding wheels, f. means for translating each of said spindles in a direction perpendicular to the plane of the bottom surface of said glass sheet for positioning the median diametric plane of said U-groove edge in the median plane of the glass sheet, and g. means for tilting each of said spindles on an axis extending transversely to such path and lying in the median plane of the glass sheet whereby pencil edges may be ground on both edges of sheets of glass of different thicknesses employing all of the surfaces of said U-grooves in the edges of said grinding wheels.

10. In an apparatus according to claim 9 glass sheet hold-down means contacting the upper surface of a glass sheet being ground and means for adjusting said hold-down means vertically relative to the conveyor for accepting glass sheets of different thicknesses.

* * * * *